US005404780A

United States Patent [19]

Berne

[11] Patent Number: 5,404,780

[45] Date of Patent: Apr. 11, 1995

[54] DEVICE FOR HOLDING IN POSITION A SHAFT IN CONTACT WITH WHICH A STRIP PASSES AND A CUTTING MACHINE USING SUCH A DEVICE

[75] Inventor: Olivier L. E. Berne, Saint Marcel, France

[73] Assignee: Eastman Kodak Company, Rochester, N.Y.

[21] Appl. No.: 61,135

[22] Filed: May 13, 1993

[30] Foreign Application Priority Data

Jun. 17, 1992 [FR] France ................................ 92 07608

[51] Int. Cl.[6] .......................... B26D 1/24; B23D 19/04

[52] U.S. Cl. ........................................ 83/500; 83/345; 83/664

[58] Field of Search ................. 83/500, 503, 506, 507, 83/508, 508.2, 508.3, 495, 505, 665, 344, 345, 664; 384/549; 464/179, 180

[56] References Cited

U.S. PATENT DOCUMENTS

| | | | |
|---|---|---|---|
| 3,183,730 | 5/1965 | Scragg et al. | 384/549 X |
| 3,359,842 | 12/1967 | Young | 83/500 |
| 4,542,671 | 9/1985 | Kesten | 83/495 X |
| 4,696,212 | 9/1987 | Tokuno et al. | 83/345 X |
| 4,759,247 | 7/1988 | Bell et al. | 83/506 X |
| 5,174,185 | 12/1992 | Aichele | 83/348 X |
| 5,178,473 | 1/1993 | Oexler et al. | 384/549 |

FOREIGN PATENT DOCUMENTS

| | | | |
|---|---|---|---|
| 1476128 | 2/1967 | France . | |
| 1038380 | 2/1959 | Germany . | |
| 2317859 | 10/1973 | Germany | 83/345 |
| 1091439 | 11/1967 | United Kingdom . | |

*Primary Examiner*—Eugenia Jones
*Attorney, Agent, or Firm*—Charles E. Snee, III

[57] ABSTRACT

A device is disclosed for limiting the movements of a shaft in response to the changes in tension in a sheet passing in contact with the shaft, and a cutting machine using such a device. The device comprises at least one cylindrically shaped member (10, 11) designed to be placed in contact with the said shaft (16) so as to limit the movements, each of the cylindrical members (10, 11) allowing two levels of contact with the shaft, a first variable level on a non-metallic surface of the member for normal tension conditions in the sheet (17) and a second, substantially fixed level for abnormally high conditions of tension in the sheet.

6 Claims, 4 Drawing Sheets

DEVICE FOR HOLDING IN POSITION A SHAFT IN CONTACT WITH WHICH A STRIP PASSES AND A CUTTING MACHINE USING SUCH A DEVICE

FIELD OF THE INVENTION

The present invention concerns a device for limiting the movements of a shaft in response to the changes in tension of a sheet of material passing in contact with the shaft. The invention also concerns a cutting machine of the blade and counter-blade type using such a device.

BACKGROUND OF THE INVENTION

FIGS. 1 and 2, to which reference is now made, show a cutting device of the blade and counterblade type normally used, notably for cutting photosensitive products.

This conventional cutting device comprises principally blades 1 and counter-blades 2 mounted respectively on two parallel shafts 3 and 4 supported at their respective ends by suitable support means (not shown). In the embodiment shown, the blades and counter-blades are of the lip type, that is to say they have, on their periphery, a surface substantially parallel to the axes of the shafts. The blades and counter-blades are held at equal axial distances from each other on each of their respective shafts by means of circular rings 5, 6 mounted on each of the shafts 3, 4. The distance between the shafts is adjusted so as to allow a certain height of engagement h between the blades and counter-blades in order to obtain a satisfactory quality of cutting of the sheet of material passing between the two cutting shafts. In addition, in order to provide an even quality of cutting, this height of engagement must not vary too much; the same applies to the uniformity of the width of strips produced. Typically the value of h is of the order of 0.6 mm.

Thus this height of engagement h must be substantially constant over the entire length of the shafts, which are supported at their ends by suitable means of the ball-bearing type well known in the art. Such an arrangement does not pose any problem for short, lightweight shafts. On the other hand, for long, heavier shafts it is necessary to provide, at one or more positions over the length of the cutting shafts, holding devices designed to limit the maximum distance between these shafts and thus to guarantee, at any point on the cutting device, a minimum penetration value h between the cutting edges of the blades and counter-blades, whatever the value of the tension of the sheet running between the shafts. In fact, the variations in tension of the sheet, due particularly to variations in thickness of the sheet as a fold or join passes, cause a relative separation of the shafts which may take out the engagement height between the blades and counter-blades leading to a phenomenon commonly referred to as "cutting jump". In such circumstances, in fact, the blades are no longer in cutting engagement with the counter-blades, thus interrupting the cutting of the sheet into longitudinal strips and damaging the cutting tools.

To resolve this problem, it is known that cylindrical support members, 7, 8, 9, 10 can be used, carried by the frame of the cutting machine and designed to be brought into contact with the shafts, either at the circular rings 5 (as shown for the shaft 3 carrying the blades) or at the peripheral surface of the counter-blades (as shown for the shaft 4 carrying the counter-blades). These cylindrical members are generally disposed in pairs (7, 8; 9, 10) for each of the shafts 3, 4 on each side of the plane passing through the centers of the two shafts. According to known techniques, bearings or cylindrical rings made from hardened steel are used, disposed so as to be continuously in contact with the shafts.

Such devices have the advantage of precisely limiting the maximum distance between the shafts because of the rigidity of the metal-to-metal contact of the cylindrical support members and the bearing surfaces on the cutting shafts. The metal-to-metal contact, however, constitutes a major drawback because of the damage to the surface of the shafts (particularly disadvantageous when the contact takes place on the blades or counter-blades) and therefore because of the damage to the sheet passing in contact with the cutting shafts. Such a contact also generates harmful vibration. According to other known devices, the problem of the metal-to-metal contact is resolved by covering the cylindrical members with a layer of flexible material such as polyurethane. The drawback of such a solution lies in the fact that, because of the thickness of the layer of flexible material (of the order of 2 mm), it does not make it possible to limit sufficiently the relative distance between the shafts when there is any abrupt change in tension in the sheet to be cut. Such a solution does not therefore avoid the problem of the cutting jumps mentioned above.

SUMMARY OF THE INVENTION

Thus one of the objects of the present invention is to provide a device for holding, in a given position, a cylindrical shaft over which a sheet of material passes, making it possible to avoid both the problems related to the metal-to-metal contact and the problems related to significant changes in position of the shaft in response to abrupt changes in tension in the sheet.

Another object of the present invention is to provide a cutting machine using at least one such holding device so as to limit the maximum distance between the two shafts on the cutting machine.

Other objects of the present invention will be clear in more detail in the following description.

In the following description, reference will be made to preferred embodiments in which the device of the invention is designed to hold, in the cutting position, blades and counter-blades carried by cutting shafts between which passes a sheet of material to be cut into strips, but it is obvious that the application of such a device is not limited to such cutting shafts. For example, the holding in position of a cylinder can be envisaged, over which passes a strip which is to be covered at that point with a coating of liquid composition, and this in order to maintain the correct distance between the coating device and coating cylinder.

These objects are achieved by providing a device for limiting the movements of a shaft in response to the changes in tension in a sheet of material passing in contact with the shaft, the shaft being supported at its ends by suitable support means, the device comprising at least one member, cylindrical in shape, designed to be placed in contact with the shaft so as to limit the movements, characterised in that each of the cylindrical members allows two levels of contact with the shaft, a first variable level on a non-metallic surface of the member for normal tension conditions in the sheet and a second, substantially fixed level for abnormally high conditions of tension in the sheet.

Advantageously, each of the members has, over a part of its width, a diameter larger than that of the remainder of the width of the member, the part of the cylindrical member which has the larger diameter being formed, at least on its periphery, from a semi-rigid, elastically deformable material, the part of the cylindrical member which is of a smaller diameter being formed from a rigid non-deformable material, the difference in diameter being such that the shaft is in contact with the larger-diameter part of the cylindrical member or members for normal tension conditions of the sheet and with the smaller-diameter part of the cylindrical member or members for abnormally high tension conditions of the sheet.

According to the present invention, a cutting machine is also produced, of the type having circular blades and counter-blades mounted on two parallel rotating shafts supported at their ends by suitable support means and between which runs a sheet of material to be cut into strips subjected to a given tension, means of support being provided for limiting the maximum distance between the two cutting shafts so as to hold the blades and counter-blades in the cutting position, characterised in that the support means comprise at least one device for holding in position according to the present invention.

BRIEF DESCRIPTION OF THE DRAWINGS

In the following detailed description, reference will be made to the drawings in which.

DETAILED DESCRIPTION OF THE INVENTION

Figure 3:
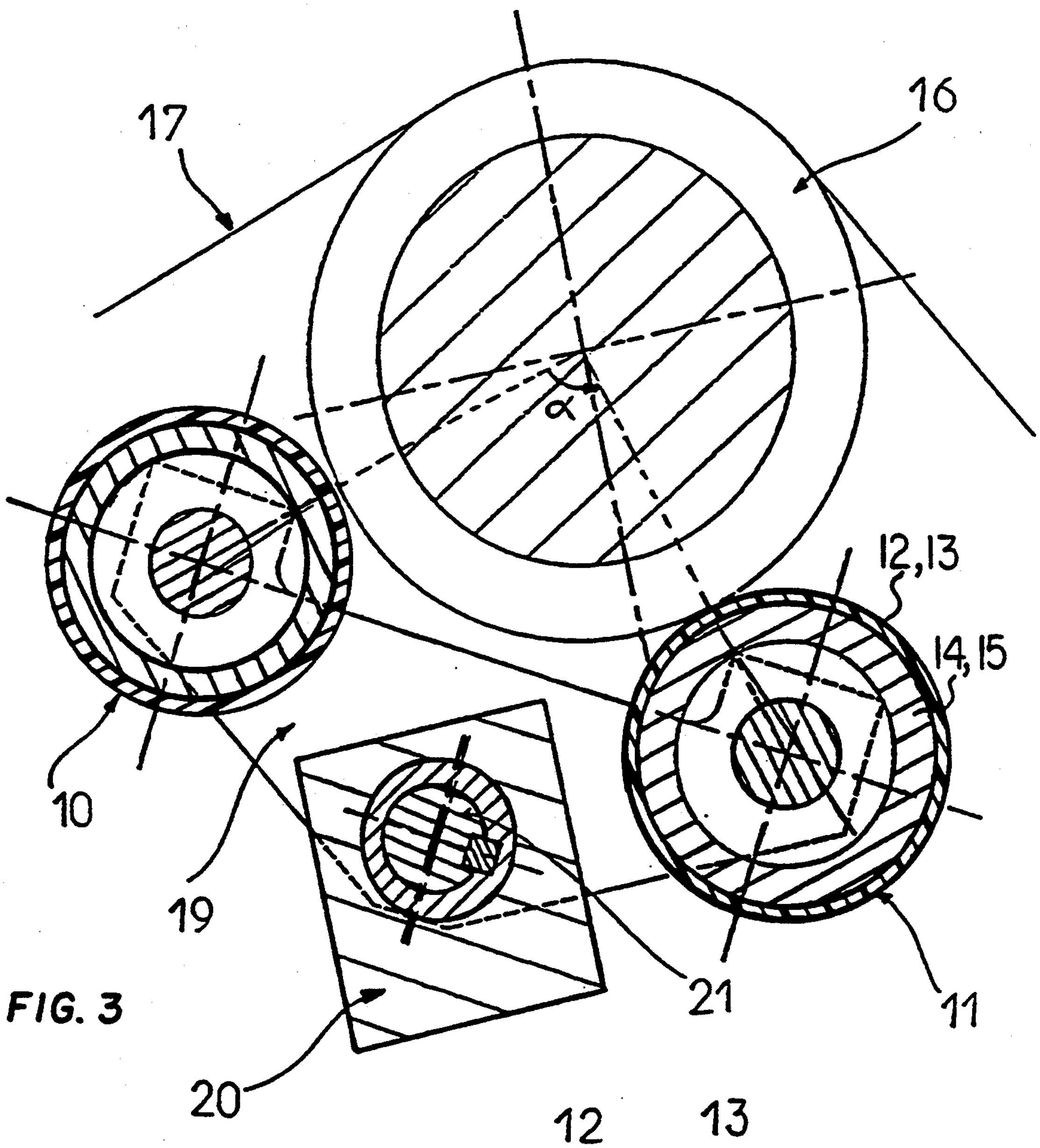
FIGS. 3 and 4 show diagrammatically a device for holding a shaft in position according to the present invention.
Figure 4:
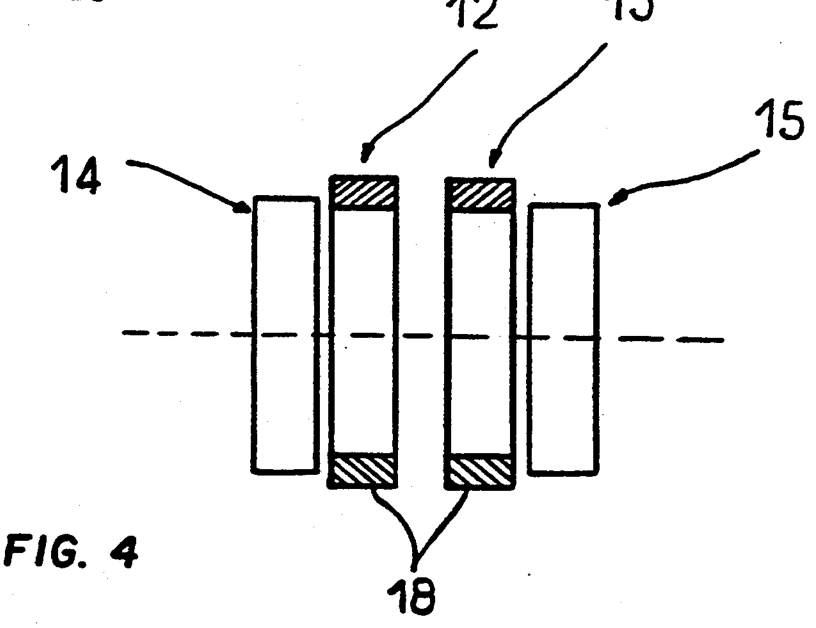

FIGS. 3 and 4, to which reference is now made, show diagrammatically an advantageous embodiment of the holding device according to the present invention. It comprises principally two cylindrically shaped elements 10, 11 disposed angularly so as to be brought into contact with a shaft 16 in a plane substantially perpendicular to the axis of the shaft and defining between them an angle . This angle, corresponding to the angle formed by the straight lines joining the axis of each of the cylindrical members to the axis of the shaft, is preferably less than 90° . Advantageously, the value of the angle is approximately 45° . Each of the cylindrical members 10, 11 has, over a part of its width 12, 13, a diameter larger than that of the remainder of the width of the member 14, 15, the part of the cylindrical member with the larger diameter 12, 13 being formed, at least on its periphery, from a semi-rigid, elastically deformable material 18. For example, polyurethane has been used, with a hardness greater than 40 SHORE A. Preferably the hardness of the polyurethane used is of the order of 95 SHORE A. In reality, any material of sufficient hardness able to resume its initial shape after being deformed by compression may be used. The part of the cylindrical member with the smaller diameter 14, 15, for its part, is formed from a rigid non-deformable material. Advantageously, a steel with high-grade mechanical properties is used, such as hardened steel (ref Z 200C 13) with 13% chromium and the hardness of which is 60 HRC as defined by the ROCKWELL test. The difference in diameter between the high parts 12, 13 and low parts 14, 15 is such that the shaft 16 is in contact with the parts of the cylindrical members 10, 11 with the larger diameter 12, 13 under normal conditions of tension of the sheet 17 and with the parts of the cylindrical members 10, 11 with the smaller diameter 14, 15 under abnormally high conditions of tension of the sheet. Such abnormally high conditions mean an increase in tension caused for example by a jerk in the unwinding or winding of the sheet, or when an excess thickness in the sheet, caused for example by a join or fold, passes between the two cutting shafts of a cutting machine. Thus, under normal conditions of tension of the sheet, the contact of the shaft on the cylindrical members 10, 11 takes place at a first level on the polyurethane surface without being in contact with the rigid parts 14 and 15 of the cylindrical members. This first contact level, because of the elasticity of the material 18, can vary within the limit of the normal variations in tension of the sheet. When a sudden variation in tension of the sheet occurs, the elastic material 18 is compressed until the shaft is in contact with the smaller-diameter parts 14 and 15 of the cylindrical members; which constitutes, because of the rigidity of the material forming these parts, a second, substantially fixed level.

As shown in FIG. 4, each of the cylindrical members 10, 11 consists of a plurality of rolls or cylinders 12, 13, 14, 15 mounted so as to rotate on the same shaft and a number of which 12, 13 have a diameter larger than that of the cylinders 14, 15. The cylinders with the larger diameter 12, 13 are formed, at least on their periphery, from a semi-rigid, elastically deformable material 18; the others 14, 15 are formed from a non-deformable material. Such an arrangement makes it possible, particularly in the case of its use with a cutting machine, to cause the various cylinders 12, 13, 14, 15 to bear on different blades or counter-blades, or on different rings separating the blades or counter-blades.

Advantageously the device according to the present invention also comprises an intermediate piece 20 designed to be fixed to the frame of the machine carrying the shaft 16. By means of a suitable connecting member 19, the cylindrical members 10, 11, free to rotate, are securely fixed to the intermediate piece 20 at a pivot point. Such a pivot point enables the cylindrical members 10, 11 to remain fully in contact with the shaft, independently of any deformation of the shaft and independently of any change in orientation of the resultant force exerted on the shaft 16 (tension of the sheet+cutting force+friction on the bearings supporting the shaft, etc). Preferably again the connecting member 19 is connected to the intermediate piece 20 by means of a device with an eccentric 21, thus enabling the cylindrical members 10, 11 to be brought to bear on or released from the shaft 16 easily.

Another solution for producing the cylindrical members of the support according to the present invention would consist of completely covering a cylinder formed from a rigid non-deformable material, such as hardened steel, with a fine layer of elastically deformable material so that, under normal conditions of tension of the sheet, the elastic layer is not completely compressed and forms a first variable contact level of the shaft with the cylindrical member. Under abnormally high tension conditions, the layer of elastically deformable material is completely compressed so that the shaft is in contact with the member at a substantially fixed level corresponding to the rigid surface of the cylinder. This solution is however less advantageous than the one mentioned previously since contact at the fixed level on the rigid member assumes complete compression of the elastically deformable layer, thus fairly rapidly impairing the elasticity of the material. In the solution described previously, because the two contact levels are not superimposed and because of the thickness of the elastic material, the contact of the cylindrical member on the rigid parts occurs before the complete compression of the layer of elastically deformable material, thus increasing the service life of the material.

Figure 2:
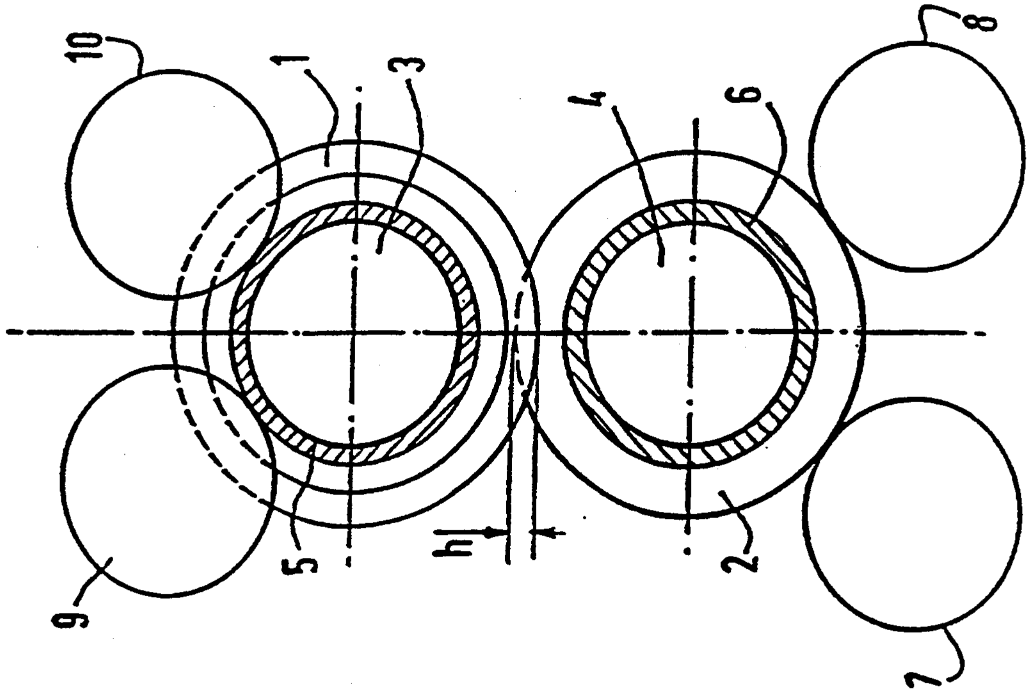
FIG. 2 (PRIOR ART)
FIG. 2 shows a view along line 2—2 of FIG. 1.
Figure 1:
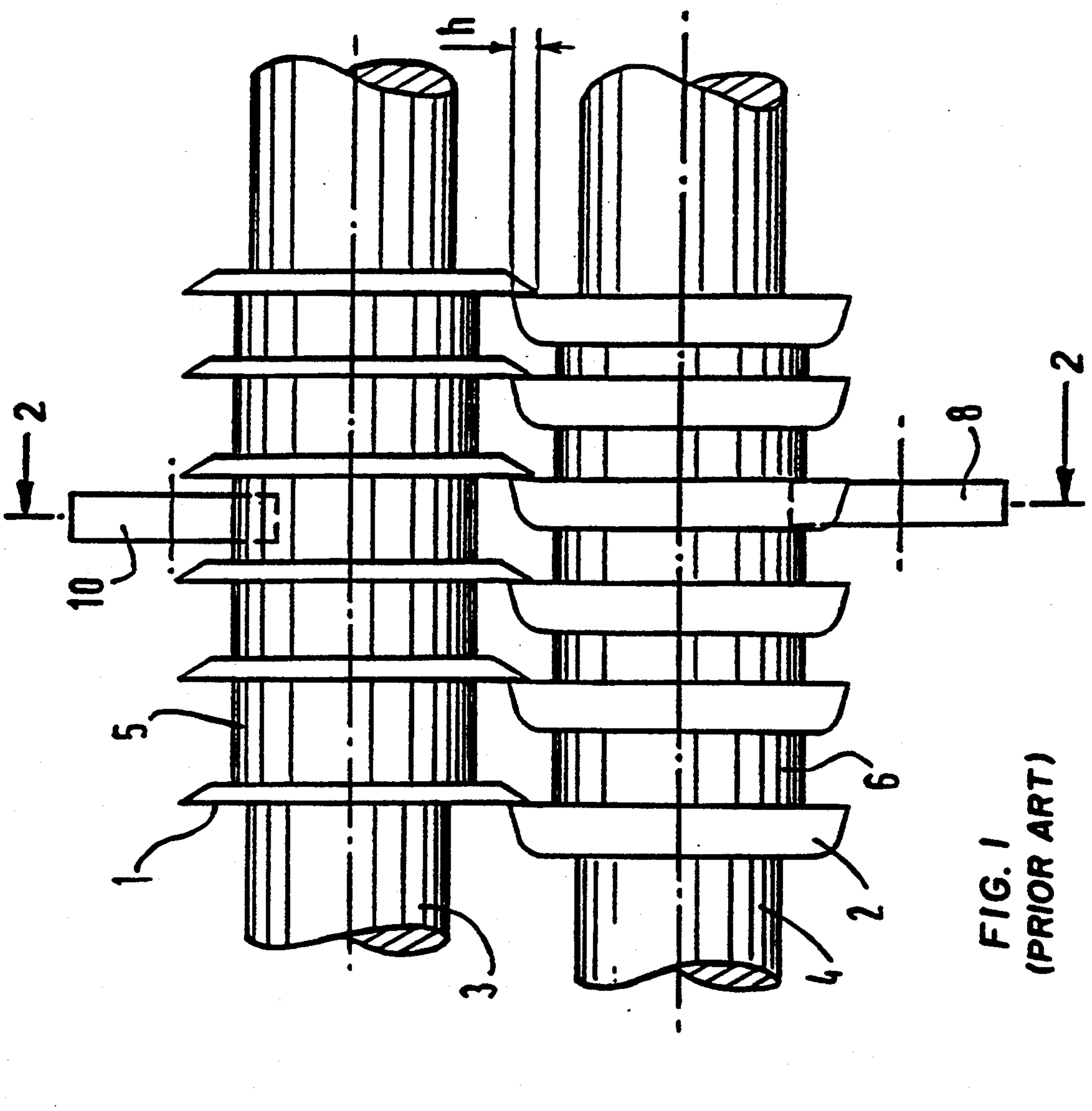
FIG. 1 (PRIOR ART)
FIG. 1 shows diagrammatically a cutting machine using a conventional device for holding the cutting shafts in position.
Figure 5:
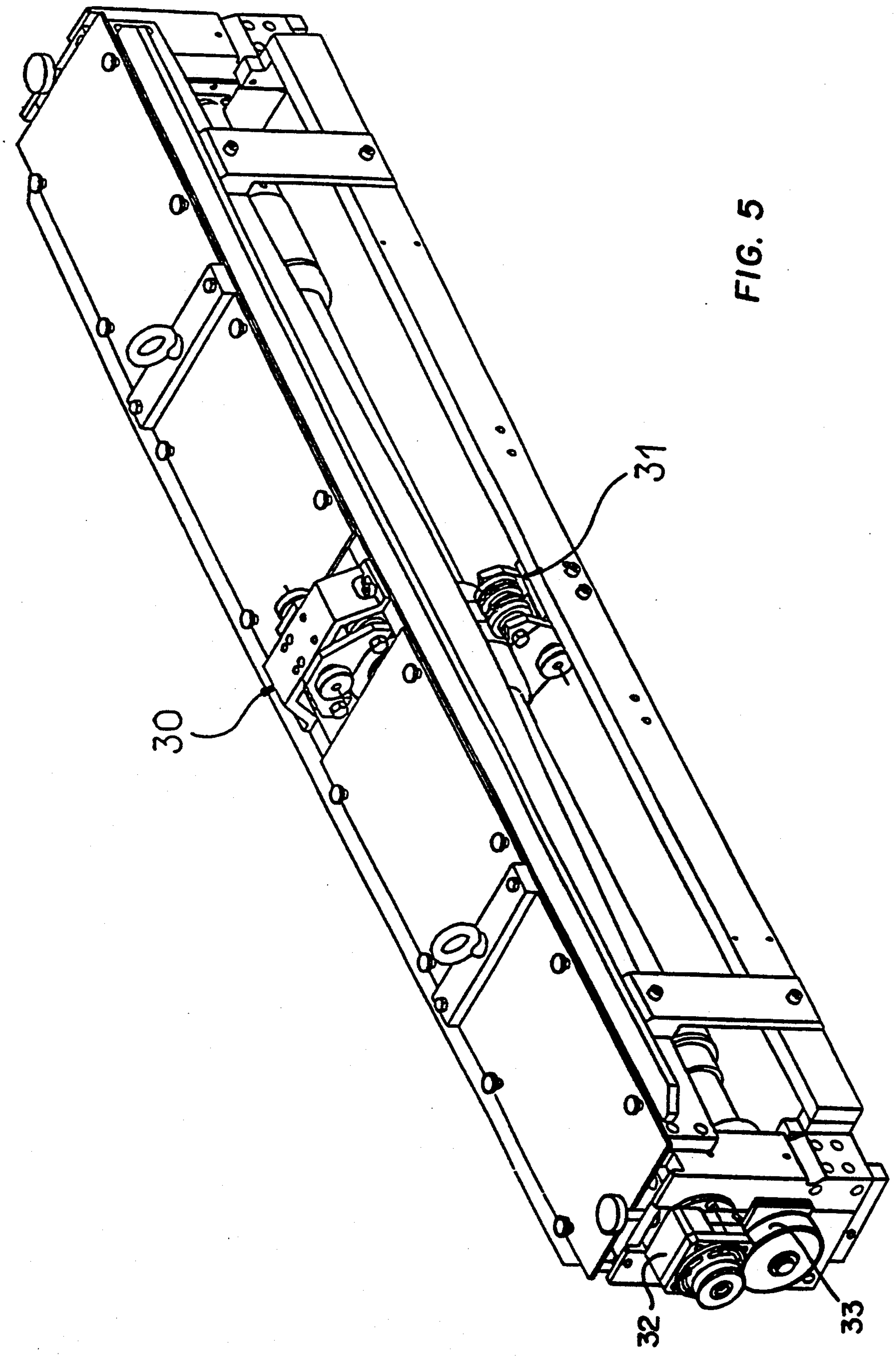
FIG. 5 shows diagrammatically a general view of a cutting machine using a support device according to the present invention.

FIG. 5 shows a general view of a cutting machine using two support members 30 and 31 according to the present invention. This cutting machine is, except for its support members 30, 31 in conformity with the present invention, entirely conventional and consequently does not require any detailed explanation other than the one given with reference to FIG. 1. In the embodiment illustrated in FIG. 5, support members 30, 31 are disposed facing each shaft, approximately at the centre of the shafts. The shafts are supported at their ends by rotational supports 32, 33, only two of which are visible in FIG. 5. It is of course obvious that it could be envisaged that a plurality of such support members would be distributed over the entire width of the shafts. The support members shown in FIG. 5 are of the same type as the ones described with reference to FIGS. 3 and 4.

Figure 6:
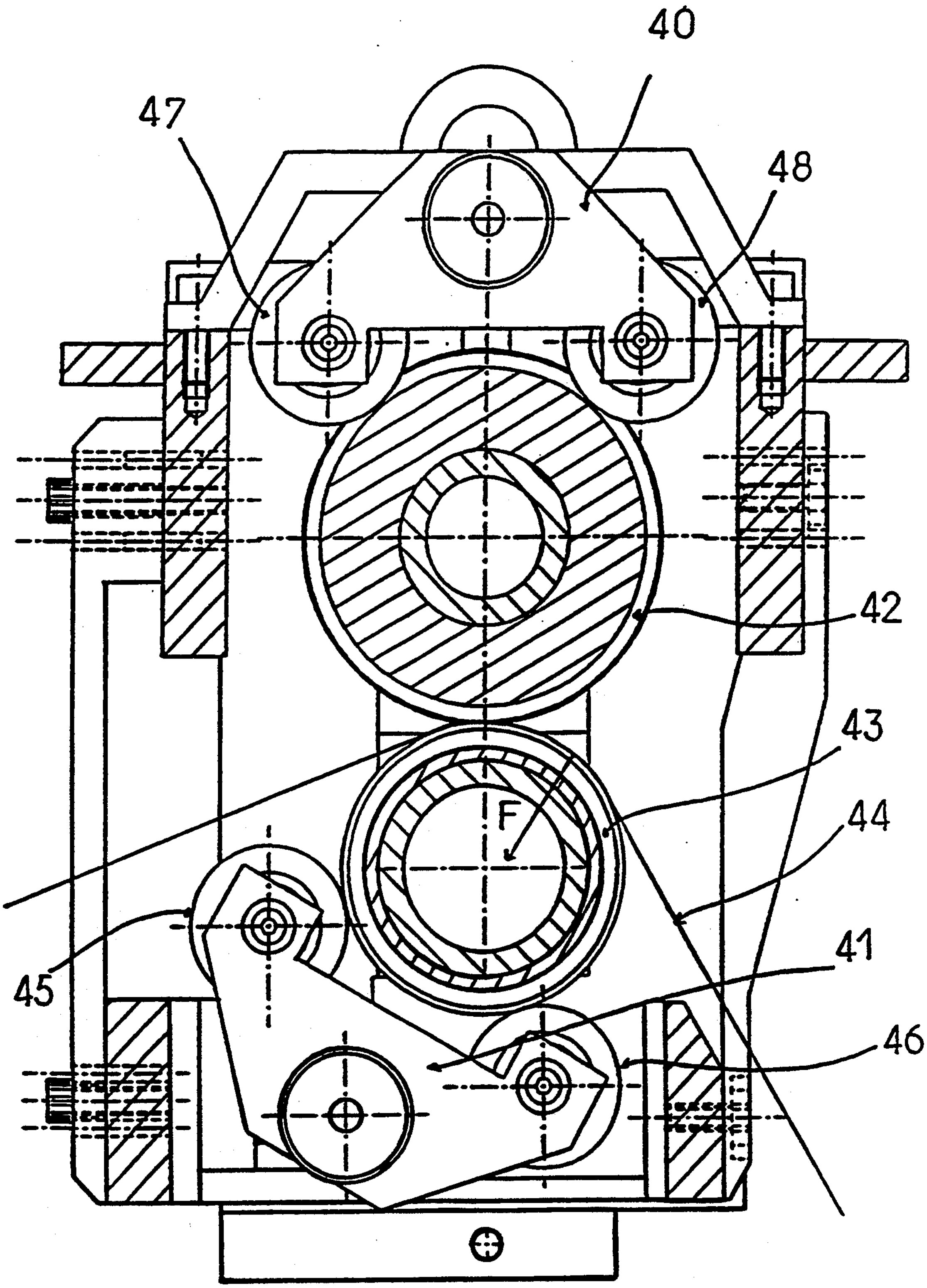
FIG. 6 illustrates diagrammatically an advantageous arrangement of the support members of the present invention with respect to the cutting shafts of the machine in FIG. 5.

FIG. 6, to which reference is now made, shows in more detail the arrangement of the support members 40, 41 with respect to the two cutting shafts 42, 43 on a cutting machine. Each of the cutting shafts 42, 43 is held in position with respect to the other by means of a support members 40, 41 according to the present invention. Each of the support members 40, 41 is in conformity with the description given with reference to FIGS. 3 and 4. The support member 41 in contact with the shaft 43 over which the sheet 44 is wound is disposed so that the angle formed by the two cylindrical members contains the resultant of the forces exerted on the shaft 43. In the embodiment shown, the support member 41 is disposed so that the angle formed by the cylindrical members 45, 46 is centred on the resultant F of the tension forces of the sheet 42 on the shaft 43.

Advantageously, as shown, the second cutting shaft 42 (in this case the shaft carrying the blades) is also held in position by means of a support member 40. In the embodiment shown here, the support member 40 is disposed so that the cylindrical members 47, 48 which constitute it are disposed symmetrically with respect to the plane passing through the axes of the two cutting shafts 42, 43. By way of example, for application to a cutting machine like the one which has just been described and for a depth of penetration h of the blades/counter-blades of 0.6 mm, the difference in height between the part with the larger diameter and the part with the smaller diameter is of the order of 0.2 mm. The thickness of the polyurethane covering on the parts of the cylindrical members with the larger diameter varies between 2 and 3 mm; this enables the cutting shafts to move apart to a maximum of 0.4 mm before coming into contact on the rigid bearing surfaces, thus preventing any cutting jump.

It is obvious that any other arrangement of the support members with respect to the cutting shafts could be envisaged without departing from the spirit of the invention.

I claim:

1. Apparatus for cutting a sheet of material, comprising:

a frame;

two parallel shafts rotationally mounted on the frame, the shafts supporting circular blades and counterblades cooperating with each other to cut into strips a sheet of material passing under tension between the shafts, the distance between the shafts being selected such that the blades and counterblades present a predetermined overlap; and at least one cylindrical member in rotational contact with at least one of the shafts for limiting radial movement of the contacted shaft, the cylindrical member including means for allowing two levels of resistance to said radial movement of the contacted shaft, a first being provided by a nonmetallic, deformable portion fixedly supported by the cylindrical member for normal tension conditions in the sheet; and a second substantially fixed level being provided by a non-deformable portion of the cylindrical member for abnormally high conditions of tension in the sheet, the non-deformable, portion being spaced from the non-metallic deformable portion along a rotational axis of the cylindrical member and spaced radially inwardly from the non-metallic deformable portion, the radially inward spacing being such that the blades and counterblades maintain at least a portion of the predetermined overlap upon deformation of the deformable portion.

2. Apparatus according to claim 1, wherein each of the two shafts is provided with two of the cylindrical members.

3. Apparatus according to claim 2, wherein the two cylindrical members associated with each of the two shafts are mounted on the frame by a pivotable piece and are symmetrically disposed with respect to a resultant force on the associated shaft due to tension forces of the sheet.

4. Apparatus according to claim 2, wherein the two cylindrical members associated with each of the two shafts arc mounted on the frame by a pivotable piece and are symmetrically disposed with respect to a plane through axes of the two shafts.

5. Apparatus for cutting a sheet of material, comprising:

a frame;

two parallel shafts rotationally mounted on the frame, the shafts respectively supporting circular blades and counterblades cooperating with each other to cut into strips a sheet of material passing under tension between the shafts, the distance between the shafts being selected such that the blades and counterblades present a predetermined overlap, the blades and counterblades being separated on their respective shafts by circular rings having diameters less than diameters of the blades and counterblades; and at least one cylindrical member, in rotational contact with at least one of the circular rings, fox limiting radial movement of the respective shaft, the cylindrical member including means fox allowing two levels of resistance to said radial movement between the cylindrical member and the circular ring, a first level being provided by a non-metallic, deformable portion fixedly supported by the cylindrical member for normal tension conditions in the sheet; and a second substantially fixed level being provided by a non-deformable portion of the cylindrical member for abnormally high conditions of tension in the sheet, the non-deformable portion being spaced from the non-metallic deformable portion along a rotational axis of the cylindrical member and spaced radially inwardly from the non-metallic deformable portion, the radially inward spacing being such that the blades and counterblades maintain at least a portion of the predetermined overlap upon deformation of the deformable portion.

6. Apparatus for cutting a sheet of material, comprising:

a frame;

two parallel shafts rotationally mounted on the frame, the shafts respectively supporting circular blades and counterblades cooperating with each other to cut into strips a sheet of material passing under tension between the shafts, the distance between the shafts being selected such that the blades and counterblades present a predetermined overlap: and at least one cylindrical member, in rotational contact with at least one of the counterblades, for limiting radial movement of the respective shaft, the cylindrical member including means for allowing two levels of resistance to said radial movement between the cylindrical member and the counterblade, a first level being provided by a non-metallic, deformable portion fixedly supported by the cylindrical member for normal tension conditions in the sheet; and a second substantially fixed level being provided by a non-deformable portion of the cylindrical member, for abnormally high conditions of tension in the sheet, the non-deformable portion being spaced frown the non-metallic deformable portion along a rotational axis of the cylindrical member and spaced radially inwardly from the non-metallic deformable portion, the radially inward spacing being such that the blades and counterblades maintain at least a portion of the predetermined overlap upon deformation of the deformable portion.

* * * * *